US008863149B2

(12) United States Patent
Tomita

(10) Patent No.: US 8,863,149 B2
(45) Date of Patent: Oct. 14, 2014

(54) MESSAGE PROCESSING APPARATUS AND MESSAGE PROCESSING METHOD

(75) Inventor: Tatsuhiko Tomita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 12/975,939

(22) Filed: Dec. 22, 2010

(65) Prior Publication Data
US 2011/0167429 A1 Jul. 7, 2011

(30) Foreign Application Priority Data

Jan. 6, 2010 (JP) ................................ 2010-001562

(51) Int. Cl.
G06F 9/46 (2006.01)
G06F 9/54 (2006.01)

(52) U.S. Cl.
CPC ................ G06F 9/542 (2013.01); G06F 9/546 (2013.01)
USPC .......................................... 719/313; 719/318

(58) Field of Classification Search
None
See application file for complete search history.

(56) References Cited

U.S. PATENT DOCUMENTS

| 5,870,605 | A * | 2/1999 | Bracho et al. | 719/318 |
| 6,704,785 | B1 * | 3/2004 | Koo et al. | 709/227 |
| 2002/0103866 | A1 * | 8/2002 | Chi et al. | 709/206 |
| 2002/0194347 | A1 * | 12/2002 | Koo et al. | 709/227 |
| 2005/0152286 | A1 * | 7/2005 | Betts et al. | 370/255 |
| 2005/0246186 | A1 * | 11/2005 | Nikolov | 705/1 |
| 2006/0053425 | A1 * | 3/2006 | Berkman et al. | 719/313 |
| 2006/0106810 | A1 * | 5/2006 | Edwards et al. | 707/10 |
| 2008/0133337 | A1 * | 6/2008 | Fletcher et al. | 705/10 |
| 2008/0168122 | A1 * | 7/2008 | Fletcher et al. | 709/201 |
| 2009/0182574 | A1 * | 7/2009 | Beardall et al. | 705/1 |
| 2011/0099232 | A1 * | 4/2011 | Gupta et al. | 709/206 |

FOREIGN PATENT DOCUMENTS

| JP | 11-232126 A | 8/1999 |
| JP | 3732671 B | 1/2006 |
| JP | 2008124977 A | 5/2008 |

OTHER PUBLICATIONS

"RPC: Remote Procedure Call Protocol Specification Version 2", Jun. 1988, Sun Microsystems.
"Common Object Request Broker Architecture: Core Specification", Mar. 2004, Object Management Group, Inc.

* cited by examiner

Primary Examiner — Tuan Dao
Assistant Examiner — Shih-Wei Kraft
(74) Attorney, Agent, or Firm — Fitzpatrick, Cella, Harper & Scinto

(57) ABSTRACT

A message processing apparatus which communicates with a plurality of software components, and transfers a message received from a software component to another software component holds a message received from a software component, manages the received message, the number of transmissions, and the holding period in correspondence with each other, and transmits the held received message to another software component in response to a delivery request from the other software component. When no new delivery request is received for the managed holding period after transmitting the received message by the managed number of transmissions, the message processing apparatus deletes the received message from the management targets.

7 Claims, 13 Drawing Sheets

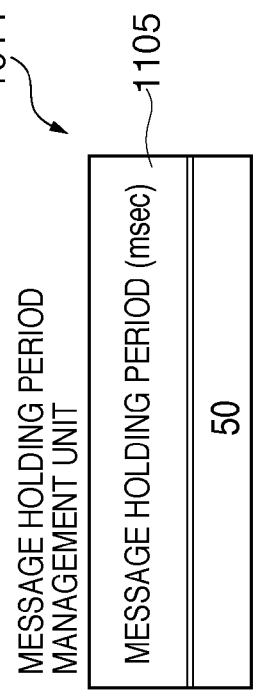
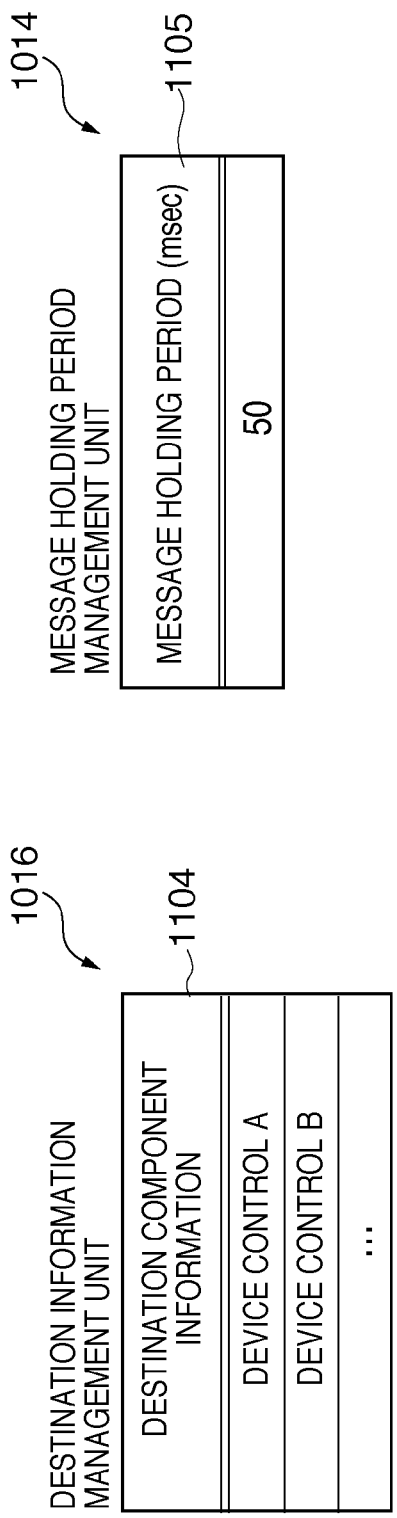
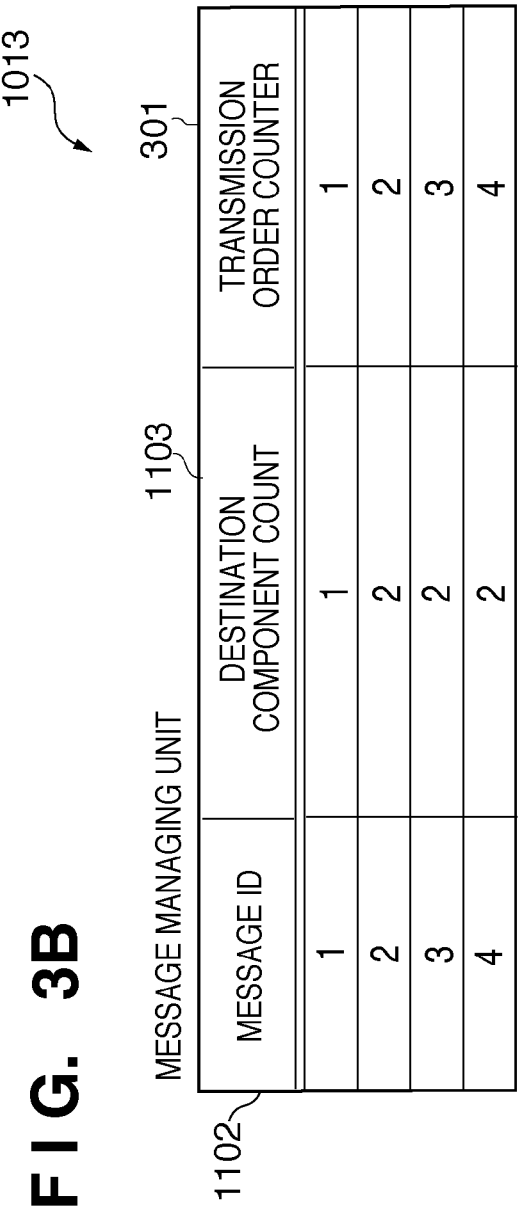
FIG. 3A  DESTINATION INFORMATION MANAGEMENT UNIT 1016
| DESTINATION COMPONENT INFORMATION 1104 |
|---|
| DEVICE CONTROL A |
| DEVICE CONTROL B |
| ... |
FIG. 3C  MESSAGE HOLDING PERIOD MANAGEMENT UNIT 1014
| MESSAGE HOLDING PERIOD (msec) 1105 |
|---|
| 50 |
FIG. 3B  MESSAGE MANAGING UNIT 1013
| MESSAGE ID 1102 | DESTINATION COMPONENT COUNT 1103 | TRANSMISSION ORDER COUNTER 301 |
|---|---|---|
| 1 | 1 | 1 |
| 2 | 2 | 2 |
| 3 | 2 | 3 |
| 4 | 2 | 4 |

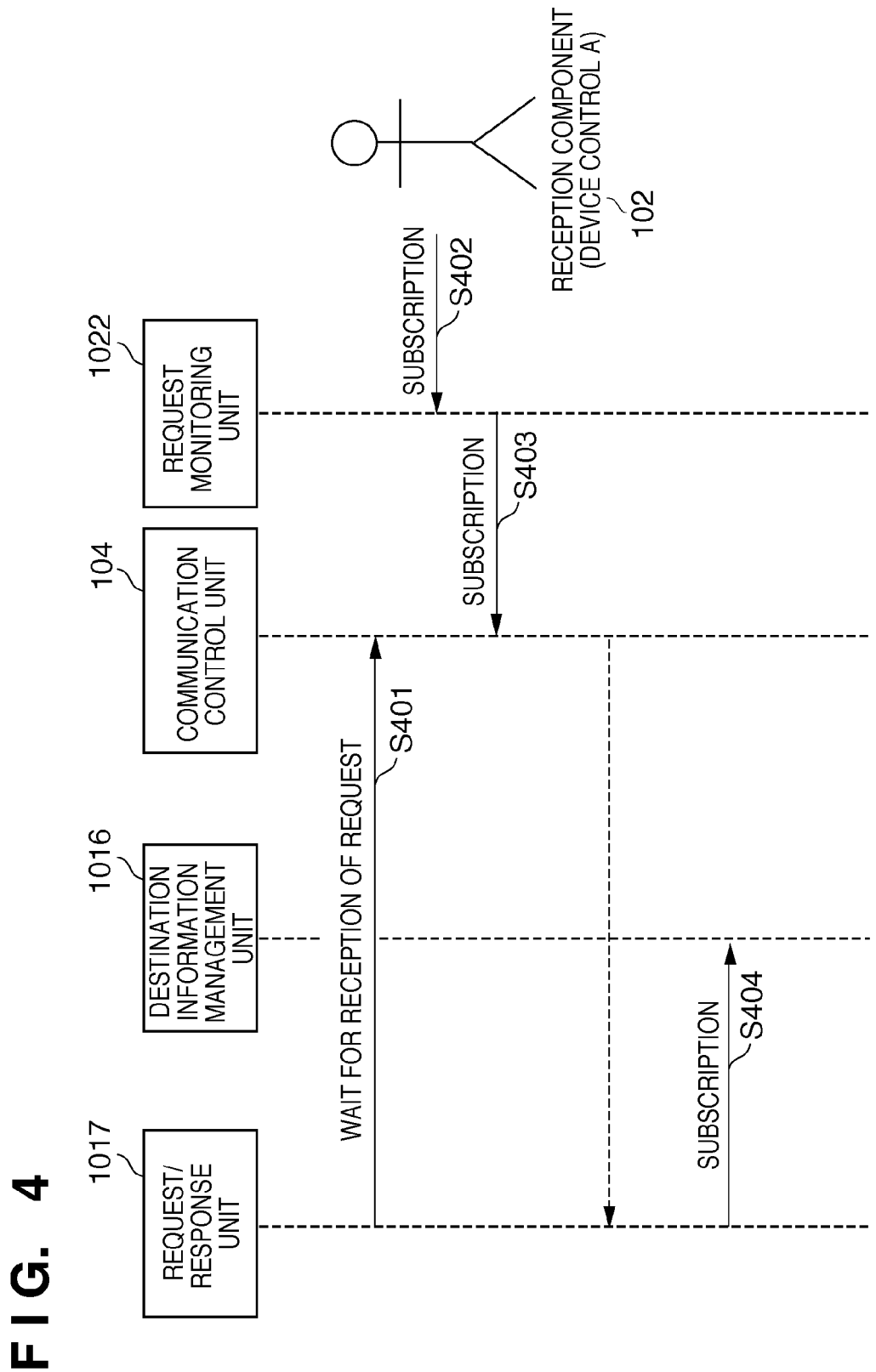

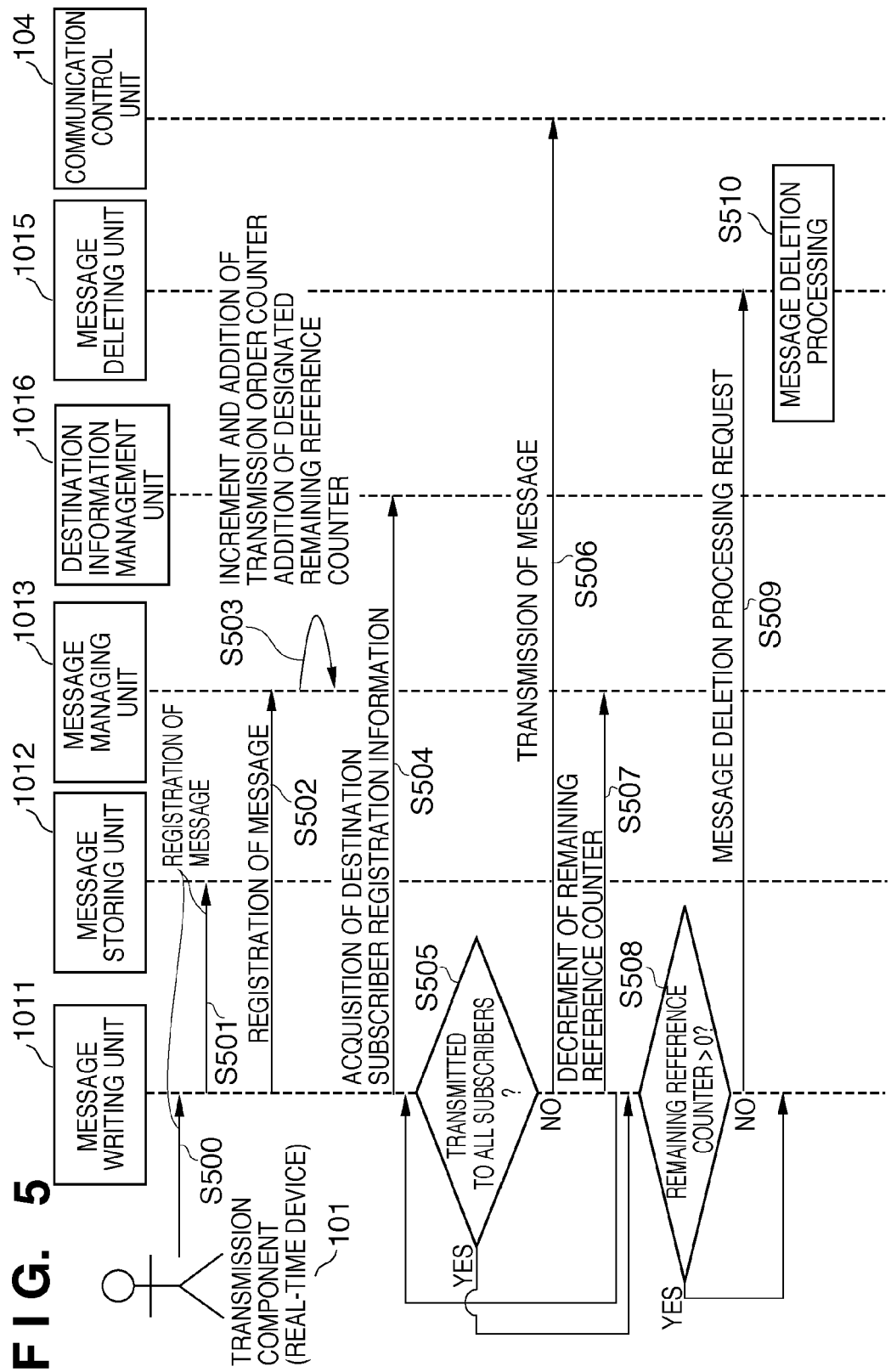

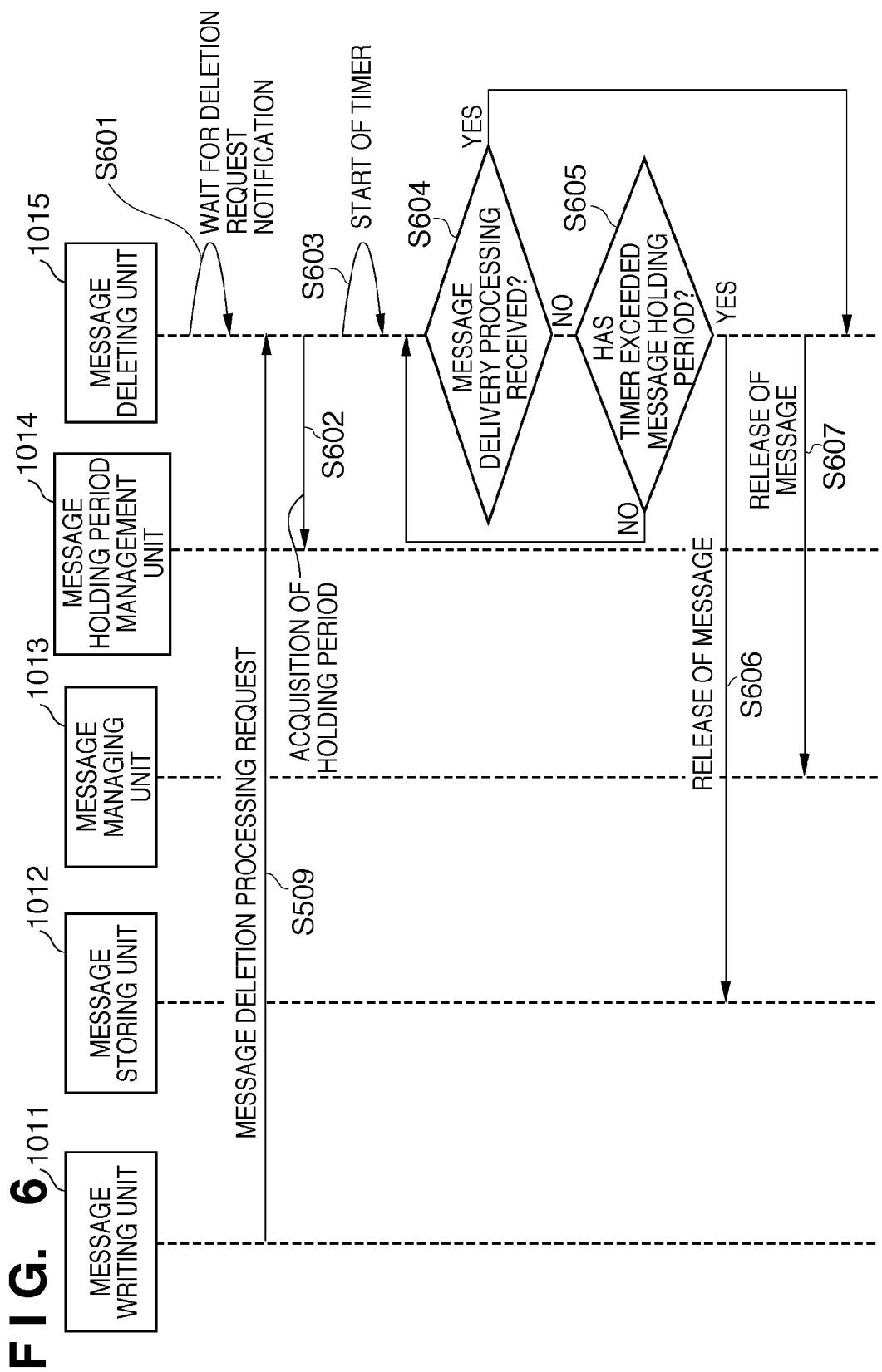

MESSAGE PROCESSING APPARATUS AND MESSAGE PROCESSING METHOD

BACKGROUND OF THE INVENTION

1. Field of the Invention

The present invention relates to a message processing method in a distributed system in which software is handled as a component, and processing proceeds by exchanging messages between a plurality of components.

2. Description of the Related Art

A distributed object technology allows software components (to be referred to as components) distributed on a plurality of processes or a network to exchange electronic information without paying attention to the physical location of the partner. In this specification, such electronic information will be called a message. In the distributed object technology, components running in different processes on the same computer, or components running on different computers via a network communicate messages to each other. Typical examples of the distributed object system are (1) RPC (Remote Procedure Call) (see "'RPC: Remote Procedure Call Protocol Specification Version 2', Sun Microsystems")

(2) CORBA (Common Object Request Broker Architecture®) (see "'Common Object Request Broker Architecture: Core Specification', Object Management Group, Inc.")

(3) JavaRMI (Java Remote Method Invocation (Java is a registered trademark) (see "Jim Farley, (Translated by Yuichi Omata), 'Java Distributed Computing', O'REILLY Japan").

These distributed object technologies have born abundant fruit in relatively large-scale systems such as a transaction processing system, data collection system, and Web service. Recently, a growing number of products are equipped with a plurality of CPUs or multiprocessor OSs even in the embedded technology. The occasion to employ communication middleware having functions equivalent to RPC and CORBA is increasing.

The communication middleware hides cumbersome communication between threads or processes, and implementation of network processing. Components exchange messages, data, and events (to be referred to as messages at once) between them using a predetermined API of communication middleware, improving component portability.

One typical implementation for realizing the distributed object technology is a server-client model. In the server-client model, a client component (to be referred to as a client) requests the use of a service, of a server component (to be referred to as a server) which provides the service. In response to the request, the server executes the service, and sends a requested message to the client. In a server-client model-based system, a client and server are not always in one-to-one correspondence. In most configurations, a plurality of clients request processes of one server. Thus, the server has a queue, temporarily registers processing request messages from a plurality of clients in the queue, and upon completion of preceding processing, extracts the next message from the queue and processes it. The server is configured to reply to a request from a client without assuming a client which requests a service. The server can be implemented without taking account of the communication partner, realizing a highly portable server component. To improve component portability, it is important to communicate between partner components without designating one component by the other.

A recent advanced message communication technology is a Publish/Subscribe model (to be referred to as a Pub/Sub model). Similar to the server-client model, the Pub/Sub model also queues messages to achieve many-to-many communication. In the Pub/Sub model, a receiver (to be referred to as a subscriber) declares in advance that it is interested in a message attribute (to be referred to as a topic) it wants to receive (this operation will be called subscription). A transmitter (to be referred to as a publisher) issues a message about a given topic. Communication middleware delivers the issued message to all subscribers that have registered subscriptions. A feature of this scheme is that both the publisher and subscriber need not know information of the partners.

In the Pub/Sub model, both the publisher and subscriber need not recognize even the network configuration of the system. Each system keeps running normally regardless of the state of the partner. In short, the Pub/Sub model is a loosely coupled system, and has higher component portability than the server-client model system in which a client designates a server and sends a message.

When implementing the above-mentioned one-to-many or many-to-many message delivery system in an embedded system, there would be quiet a number of use cases in which a message delivered in the past needs to be received. For example, a case in which a copying machine where a plurality of components runs in cooperation with each other on a multi-CPU is to be activated quickly will be examined. In general, a building component of the copying machine communicates messages to other components, and activates the system while normally updating the state of the building component. However, all components cannot be activated simultaneously owing to resource limitations of the CPU, memory, and the like, so some components are activated sequentially. To start up the system quickly, components necessary to at least operate the system need to be activated preferentially. Even at this time, there is a need to receive, by a component activated later, a message delivered by a component activated first, and normally update the state of the component activated later as if it were activated from the beginning.

As another use case, even when a subscription from a subscriber is not received temporarily owing to a communication path fault or the like in a system which implements the Pub/Sub model, the subscriber wants to receive an expected message. However, an implementation in which a transmission component such as a server or publisher holds a message in consideration of a component that sends reception request and/or subscription later, is not desirable because this degrades the high portability, as described above.

To solve this problem, there is proposed a method of holding a message in communication middleware for a predetermined period not to delete the message immediately after delivery (see Japanese Patent No. 3732671). There is also known a method of, when the message issue time of a message issued by a publisher is later than the subscription time of a subscriber, delivering the message to the subscriber (see Japanese Patent Laid-Open No. 2008-124977).

In the technique disclosed in Japanese Patent No. 3732671, a message issued by a transmission component is held for a predetermined period, and can be transmitted to a reception component activated with a delay. A case in which a reception component is activated later in order to realize the foregoing activation time shortening use case will be examined. At this time, the message holding period may elapse depending on the activation timing of the reception component, and the reception component may not be able to receive an expected message. When the message holding period is set long in consideration of this, the data holding area becomes full soon if the message issue interval of a transmission component is short. Generally, the timing when a reception component is activated and starts receiving a message depends on the activation mode and the use state of the product. In many cases, a reception component is dynamically generated in accordance with the use state of the system. It is therefore difficult to accurately predict the message holding period. To reliably receive a message expected by a component activated later, it is not sufficient to determine the message deletion timing only by the message-holding period.

In the technique disclosed in Japanese Patent Laid-Open No. 2008-124977, a subscriber registers a subscription together with the subscription time. Even if the subscription is not received temporarily owing to a network fault or the like, the subscriber can receive a message issued by a publisher after the subscription time. However, in device-embedded software, the number of running components is often limited as typified by the copying machine quick activation use case. In most cases, it is difficult to operate a subscriber and register a subscription before the publisher runs.

SUMMARY OF THE INVENTION

The present invention has been made to solve the conventional problems, and has as its object to provide a message processing apparatus and method capable of more reliably receiving a message by a reception component without exhausting the memory.

According to one aspect of the present invention, there is provided a message processing apparatus which communicates with a plurality of software components, and transfers a message received from a software component to another software component, the apparatus comprising: a holding unit configured to hold a message received from a software component; a management unit configured to manage the received message, the number of transmissions, and a holding period in correspondence with each other; a transmission unit configured to transmit the received message held in the holding unit to another software component in response to a delivery request from the other software component; and a deletion unit configured to delete the received message from management targets of the holding unit and the management unit when no new delivery request is received for the holding period after the transmission unit transmits the received message by the number of transmissions managed by the management unit.

Further features of the present invention will become apparent from the following description of exemplary embodiments with reference to the attached drawings.

BRIEF DESCRIPTION OF THE DRAWINGS

FIGS. 3A to 3C are tables exemplifying tables managed by communication middleware in the embodiment;

FIG. 4 is a chart exemplifying the sequence of message subscription processing according to the embodiment;

FIG. 5 is a chart exemplifying the sequence of message transmission processing according to the embodiment;

FIG. 6 is a chart exemplifying the sequence of message deletion processing according to the embodiment;

DESCRIPTION OF THE EMBODIMENTS

Preferred embodiments of the present invention will now be described with reference to the accompanying drawings. It should be noted that the following embodiments are merely examples of the present invention and are not intended to limit the scope of the invention.

<First Embodiment>

Figure 2:
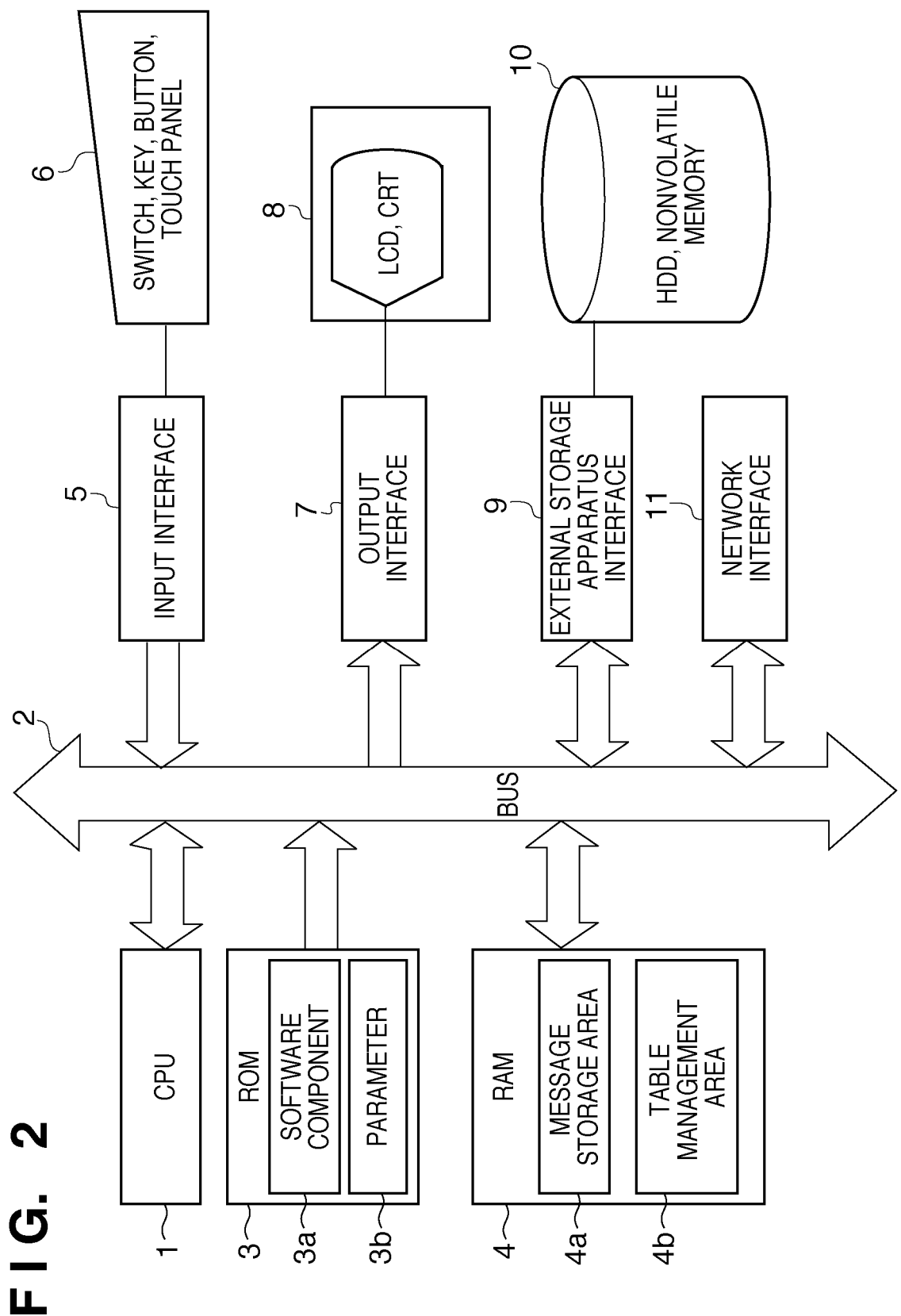
FIG. 2 is a block diagram showing the hardware configuration of the system according to the embodiment.

FIG. 2 is a block diagram exemplifying the overall arrangement of an information processing apparatus (computer system) according to the first embodiment. A CPU 1 accesses units 3 to 11 (to be described later) via a bus 2, and performs various kinds of control. The CPU 1 can access the ROM (Read Only Memory) 3 via the bus 2, and the ROM 3 stores processing programs including a plurality of software components 3a, and parameters 3b used by the software components 3a. The RAM (Random Access Memory) 4 holds a message storage area 4a and table management area 4b which are created/changed by the software components 3a. The input interface 5 receives an input via the input device 6 including a switch, key, button, and touch panel. The output interface 7 displays/outputs data on the display medium 8 such as a CRT or LCD. The external storage apparatus interface 9 inputs/outputs data to/from the external storage apparatus 10 such as an HDD or nonvolatile memory.

In the embodiment, assume that the software component 3a and parameter 3b are stored in the ROM 3, and the storage areas 4a and 4b of data to be processed are ensured in the RAM 4. However, the present invention is not limited to this. For example, the external storage apparatus 10 can store all these data. In this case, if necessary, these data are loaded from the external storage apparatus 10 into the RAM 4, and used by the CPU 1. These data can also be stored in the cache memory of the CPU 1. The message storage area 4a is a location where messages transmitted and received by software components are stored. The table management area 4b is a location where information for managing a message is stored. The network interface 11 is a device which communicates with another node (CPU) of a local area network (LAN), wireless LAN, serial bus, or the like. As a variation of the connection configuration with another node, CPUs are connected via a hardware bus or dual port RAM. In this case, the CPUs can exchange data via a driver which performs communication between buses, similar to a network interface. The system according to the embodiment is configured so that application programs on different CPUs can exchange messages (message processing) via middleware which hides the physical communication schemes of these CPUs.

Figure 1:
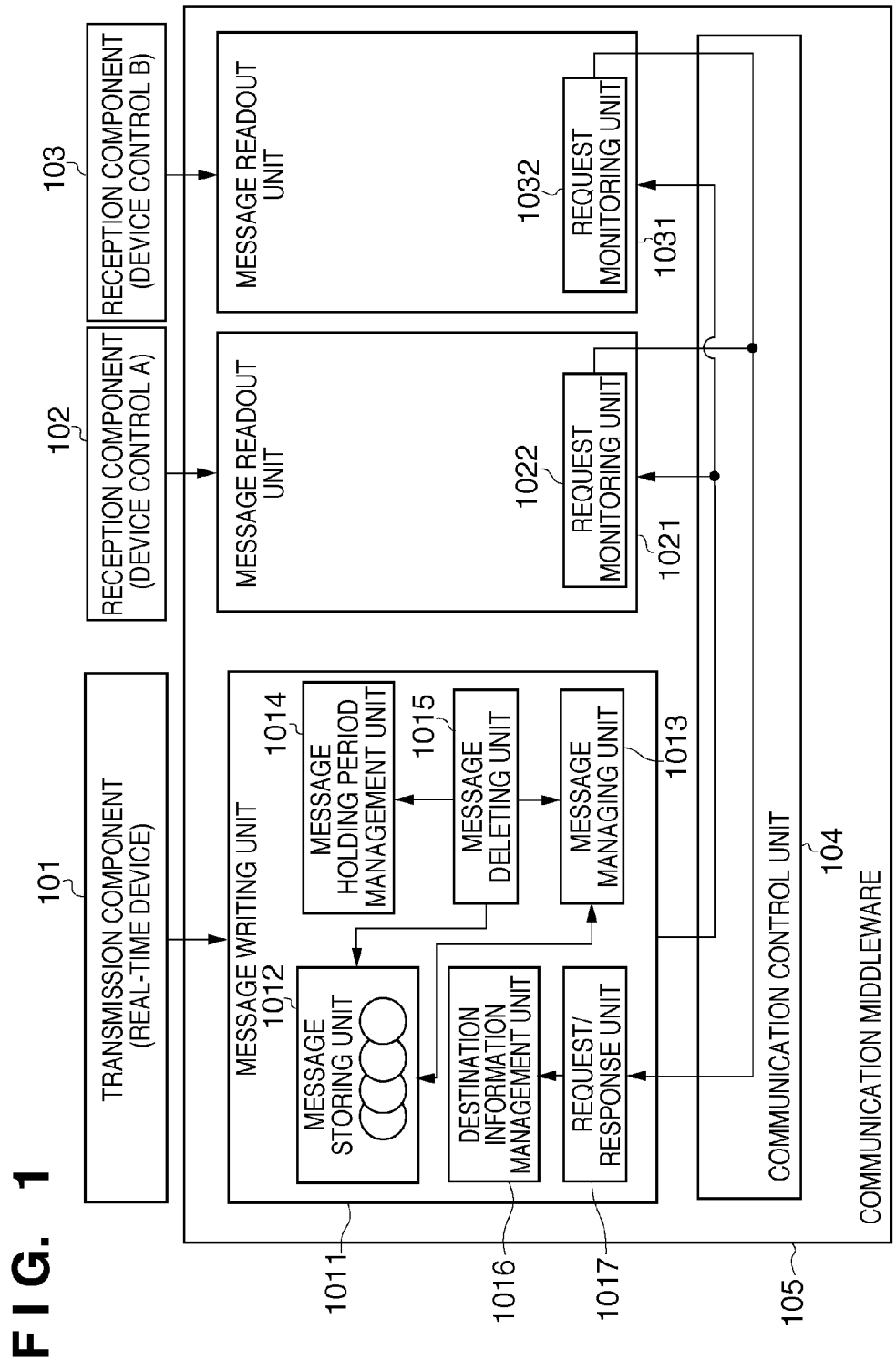
FIG. 1 is a block diagram showing the software configuration of a system according to an embodiment.

FIG. 1 exemplifies in detail a software configuration in the system. FIG. 1 shows the building components of a plurality of software components 3a which run in cooperation with each other, and the relationship between these building components and management data stored in the storage area 4a. Assume that an operating system (not shown) runs on the computer system shown in FIG. 2. Also assume that a plurality of software components 3a run on the operating system. A transmission component 101 is a software component which transmits a message. The embodiment assumes that the transmission component 101 is a real-time device component which acquires information from a device periodically or at an arbitrary timing. Reception components 102 and 103 are software components which receive a message, and run on the computer system or another computer system. The embodiment assumes that the reception components 102 and 103 are device control components A and B, which control various devices in accordance with information, obtained from the real-time device. The embodiment also assumes communication middleware 105 which supports implementation of a Pub/Sub model. The transmission component 101 serves as a publisher, and the reception components 102 and 103 serve as subscribers. In this configuration example, the number of computers which build the system is not specified, but the embodiment is applicable to a system formed from one or more computers. As the classification of transmission and reception components, only the relationship between two software components is shown. That is, a given software component can serve as both transmission and reception components.

A message writing unit 1011 receives a message issued by the transmission component 101. In the Pub/Sub model, the message writing unit 1011 exists for each topic. A message storing unit 1012 holds a message issued by the transmission component. A message managing unit 1013 manages a destination component count for each message stored in the message storing unit 1012. A message holding period management unit 1014 manages the period during which a message is held in accordance with a topic. A message deleting unit 1015 deletes a message for which the destination component count managed by the message managing unit 1013 becomes 0. At this time, the message deleting unit 1015 deletes a message from the message storing unit 1012 and message managing unit 1013 after holding it for a holding period managed by the message holding period management unit 1014. A destination information management unit 1016 manages information of a destination component which has registered a subscription to a topic. A request/response unit 1017 accepts a subscription to a topic, and a request to deliver a held message. Upon accepting a subscription to a topic, the request/response unit 1017 stores, in the destination information management unit 1016, information of a destination component which has registered the subscription. Message readout units 1021 and 1031 receive messages and transfer them to the reception components 102 and 103. Request monitoring units 1022 and 1032 monitor topic subscription requests and past message delivery requests from the reception components 102 and 103, and when these requests come, notify the request/response unit 1017 of them. A communication control unit 104 controls exchange of messages between the message writing unit 1011 and the message readout units 1021 and 1031. The communication control unit 104 allows communication with one or more computers.

Figure 10:
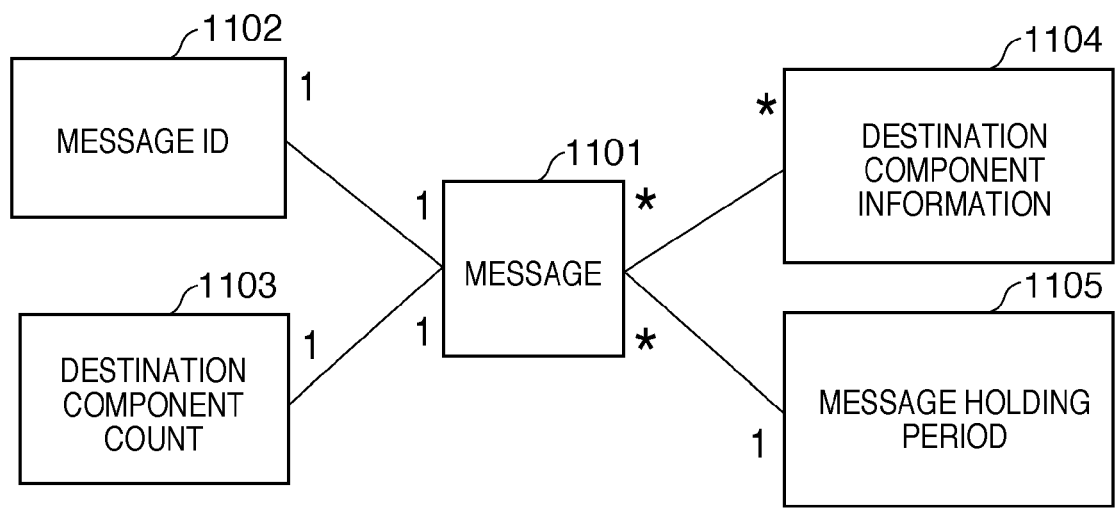
FIG. 10 is a view showing the association between data according to the embodiment.

FIG. 10 is a view showing the association between data used in the first embodiment. A message 1101 is transmitted/received between components, and held in the message storing unit 1012. The message managing unit 1013 adds, to each message 1101, data of a message ID 1102 for identifying the message, and a destination component count 1103 (number of transmissions defined for a message). The message 1101 is also associated with destination component information 1104 indicating the destination of the message 1101, and a holding period 1105 of the message 1101. In FIG. 10, "1" means that the number of corresponding data in the correspondence is 1, and "*" means that the number of corresponding data is unspecified.

Figure 11:
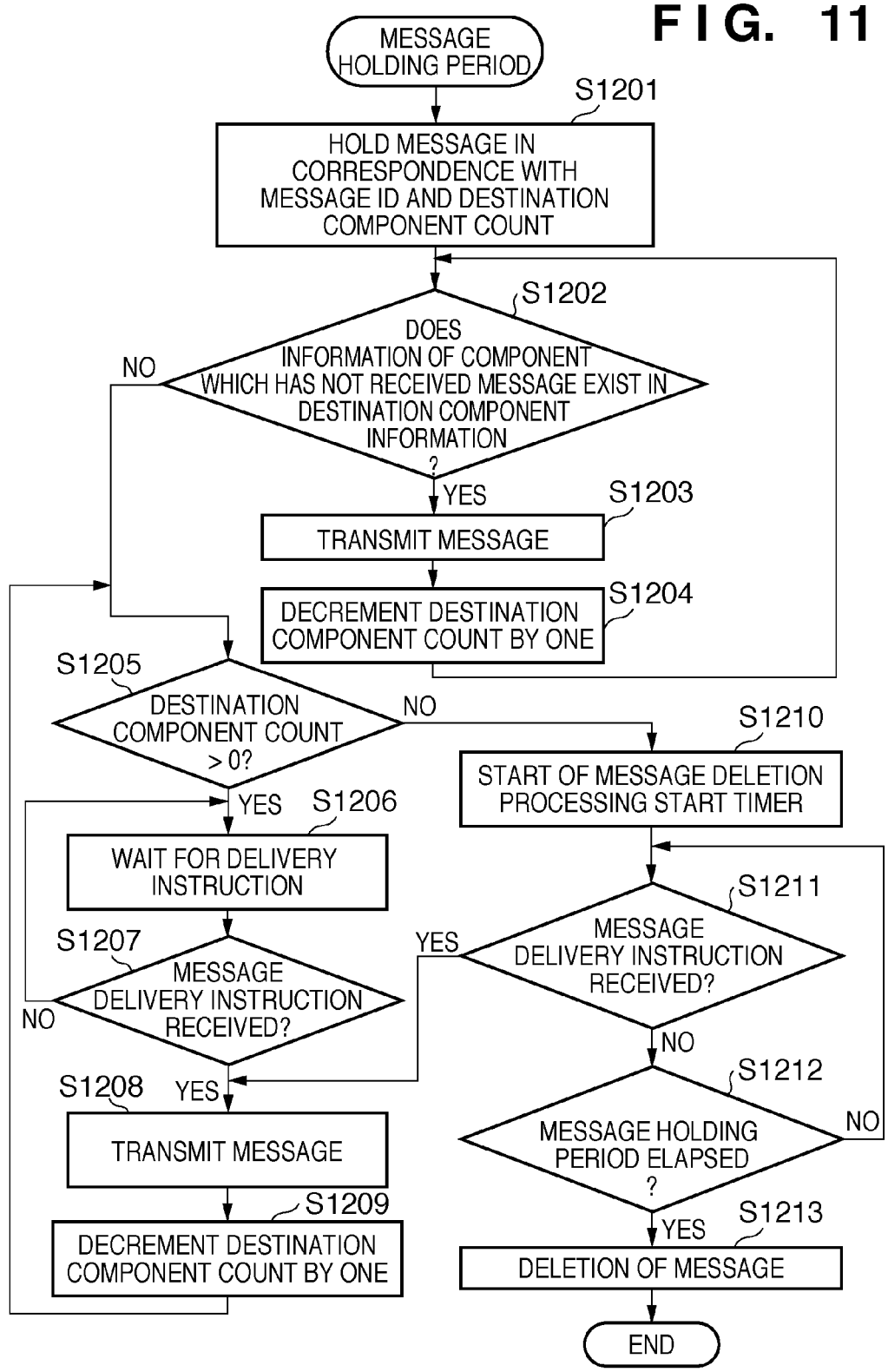
FIG. 11 is a flowchart exemplifying the sequence of processing which pays attention to a message according to the embodiment.

Processing of receiving the message 1101 by the communication middleware 105 from the transmission component 101 and deleting it will be explained with reference to FIG. 11. Upon receiving an instruction from the transmission component 101 to transmit the message 1101, the message writing unit 1011 holds the message 1101 in the message storing unit 1012 in correspondence with the message ID 1102 and destination component count 1103 (step S1201). By referring to the destination component information 1104 which is managed by the destination information management unit 1016 in correspondence with the message 1101, the message writing unit 1011 determines whether there is a component which has not received the message 1101 (step S1202). If there is a component which has not received the message 1101 (YES in step S1202), the message writing unit 1011 transmits the message 1101 to the component (step S1203). The message managing unit 1013 decrements the destination component count 1103 of the message 1101 by one (step S1204). The message writing unit 1011 repeats the processes in steps S1203 and S1204 until all components managed by the destination information management unit 1016 have received the message 1101.

If all components have received the message 1101 (NO in step S1202), and the destination component count 1103 of the message 1101 is larger than 0 (YES in step S1205), the request/response unit 1017 waits for an instruction to deliver the message 1101 (step S1206). If the request/response unit 1017 receives the message delivery instruction (YES in step S1207), it transmits the message 1101 to the designated component (step S1208). The message managing unit 1013 then decrements the destination component count 1103 by one (step S1209). The processes in steps S1206 to S1209 are repeated until the destination component count 1103 becomes 0. If the destination component count 1103 becomes 0 (NO in step S1205), the message deleting unit 1015 starts the timer for message deletion processing (step S1210). If the message delivery instruction is received (YES in step S1211) before the lapse of the message holding period 1105 managed by the message holding period management unit 1014 (NO in step S1212), the message deletion processing stops, and the process shifts to message transmission processing in step S1208. If the process advances to step S1210 again, the message deleting unit 1015 resets the timer for message deletion processing, and then starts it. If the message holding period 1105 has elapsed without receiving a message delivery instruction (YES in step S1212), the message deleting unit 1015 deletes the message 1101 (S1213).

FIGS. 3A to 3C are tables exemplifying data structures used in the first embodiment. FIG. 3A exemplifies a data structure managed by the destination information management unit 1016, and this data structure has the destination component information 1104 as an element. FIG. 3B exemplifies a data structure managed by the message managing unit 1013, and this data structure has the message ID 1102 and destination component count 1103 as elements. Further in the embodiment, this data structure has, as an element, a transmission order counter 301 for managing the order in which messages were transmitted. FIG. 3C exemplifies a data structure managed by the message holding period management unit 1014, and this data structure has the message holding period 1105 as an element.

FIG. 4 is a chart showing the sequence of subscriber registration processing for a given topic in the first embodiment. In the following description, the reception component 102 in FIG. 4 is subscriber A. The request/response unit 1017 which exists for each topic instructs the communication control unit 104 to wait for reception of a request in preparation for a subscriber registration request (step S401). If subscriber A instructs the communication middleware 105 about a subscription to the topic (step S402), the request monitoring unit 1022 receives the instruction, and registers the subscription to the topic via the communication control unit 104 (step S403). The request/response unit 1017 registers the received information of subscriber A in the destination information management unit 1016 (step S404).

FIG. 5 is a chart showing the sequence of publisher message transmission processing in the first embodiment. In the following description, the transmission component 101 in FIG. 5 is publisher A. Publisher A instructs the communication middleware 105 to transmit a message about a given topic. The message writing unit 1011 corresponding to the topic receives the instruction (step S500), and registers the message in the message storing unit 1012 and message managing unit 1013 (steps S501 and S502). The message managing unit 1013 holds the transmission order counter 301 indicating the transmission order of the message, and the destination component count 1103 designated for the topic in correspondence with each other (step S503). The embodiment assumes that the destination component count 1103 is set in advance in the communication middleware for each topic. However, the publisher may designate the destination component count 1103 in topic registration. It suffices to increment the value of the transmission order counter 301 by one immediately before adding it to a message, and then add it to the message. The destination component count 1103 functions as a "remaining reference counter" whose numerical value is decremented in response to transmission of a corresponding message. Steps S501 to S503 correspond to step S1201 in FIG. 11.

The message writing unit 1011 acquires destination subscriber information (destination component information) of the topic from the destination information management unit 1016 (step S504). If a destination subscriber exists (YES in step S505), the message writing unit 1011 transmits the message via the communication control unit 104 (step S506). After that, the message writing unit 1011 instructs the message managing unit 1013 to decrement the destination component count 1103 of the transmitted message by one (step S507). The processes in steps S505 to S507 are executed for all destination subscribers acquired in step S504. These processes correspond to steps S1202 to S1204 in FIG. 11. After the end of transmitting the message to all the registered destination subscribers, the message writing unit 1011 checks the destination component count 1103 of the message (step S508). If the destination component count 1103 of the message is 0 (NO in step S508), the message writing unit 1011 requests message deletion processing of the message deleting unit 1015 (step S509). The processes in steps S508 to S510 correspond to those in steps S1205, S1210, and S1212. The message deletion processing will be explained in detail with reference to FIG. 6 (step S510).

FIG. 6 is a chart showing the sequence of message deletion processing in the first embodiment. First, the message deleting unit 1015 waits for notification of a message deletion request (step S601). If the message deleting unit 1015 receives a message deletion request from the message writing unit 1011 (step S509), it acquires the message holding period 1105 from the message holding period management unit 1014 (step S602). The message deleting unit 1015 clears the timer and then starts it (step S603). If the message deleting unit 1015 receives message delivery processing during the message deletion processing, it ends the message deletion processing (YES in step S604). Although not shown in FIG. 6, after the message deleting unit 1015 ends the message deletion processing, it returns to step S601 to repeat message deletion request notification wait processing. If the message deleting unit 1015 does not receive message delivery processing (NO in step S604), it compares the message holding period 1105 with the timer value (step S605). If the timer value has exceeded the message holding period (YES in step S605), the message deleting unit 1015 instructs the message storing unit 1012 and message managing unit 1013 about release of the message (steps S606 and S607). Note that the timer is prepared for each topic. Even if message deletion processes simultaneously occur for different topics, these message deletion processes are managed by independent timers.

Figure 7:
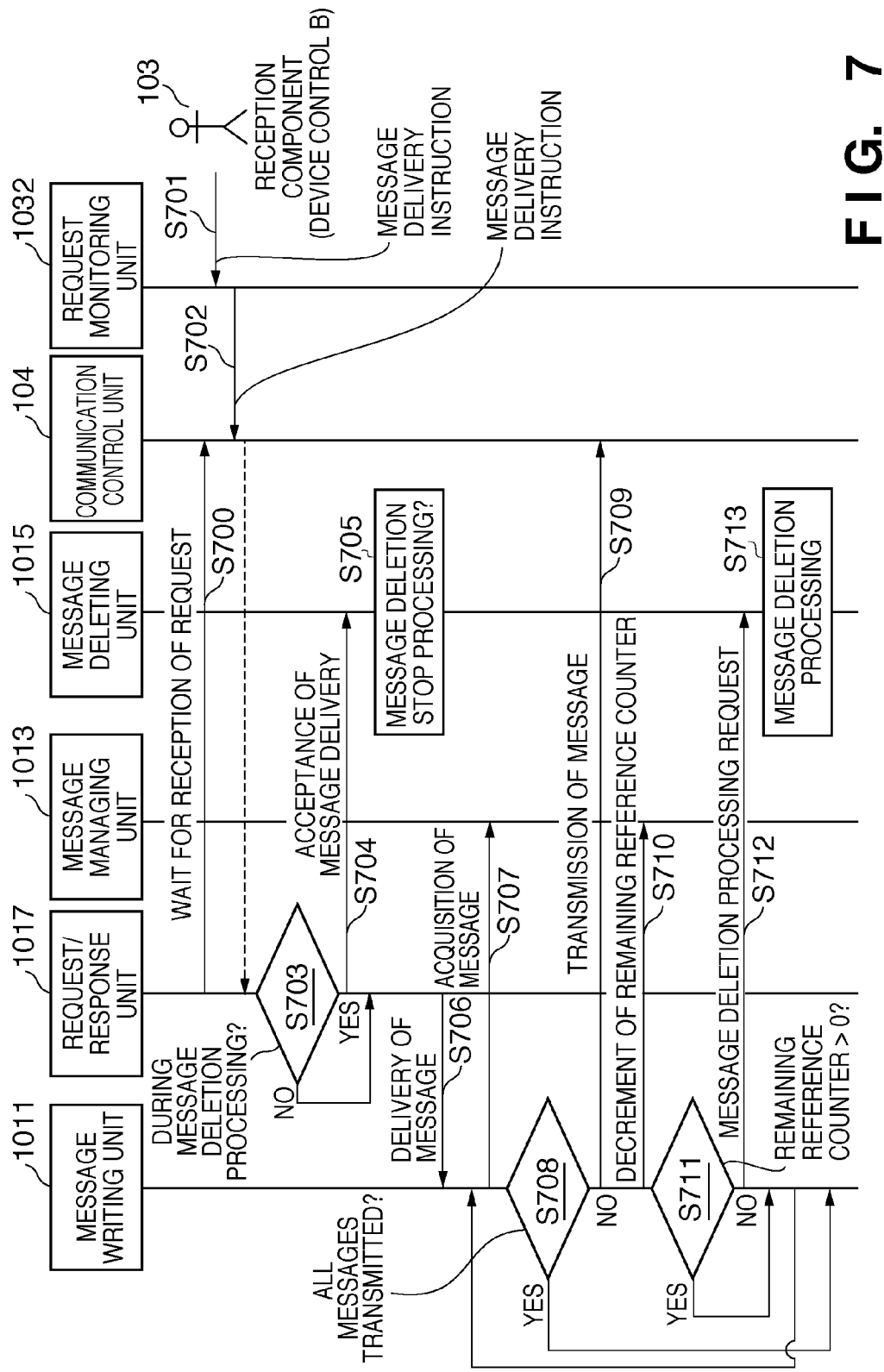
FIG. 7 is a chart exemplifying the sequence of message delivery processing according to the embodiment.

FIG. 7 is a chart showing the sequence of processing of delivering a held message to a newly entered subscriber in the first embodiment. In the following description, the reception component 103 in FIG. 7 is subscriber B. The embodiment assumes a case in which subscriber B is activated a predetermined period of time after the system is activated, to meet an activation time shortening request.

To accept a message delivery request from another component, the request/response unit 1017 instructs the communication control unit 104 to wait for reception of a request (step S700). If the request monitoring unit 1032 receives a delivery instruction from subscriber B (step S701), it issues a message delivery instruction about a topic via the communication control unit 104 (step S702). Upon receiving the instruction, the request/response unit 1017 determines whether the message, delivery of which is requested, is during deletion processing. If the message is during deletion processing (YES in step S703), the request/response unit 1017 notifies the message deleting unit 1015 of the acceptance of the message delivery (step S704), in order to stop message deletion processing in progress. The sequence of the message deletion stop processing (step S705) after receiving the message delivery acceptance notification has been described with reference to FIG. 6. Thereafter, the request/response unit 1017 instructs the message writing unit 1011 to deliver a message (step S706). The message writing unit 1011 acquires a message managed by the message managing unit 1013 (step S707). The embodiment assumes that a message is acquired in the transmission order by referring to a transmission order counter corresponding to the message. If there is no message managed by the message managing unit 1013, or all messages, delivery of which has been requested, have been transmitted, the process ends (YES in step S708). If there is a message to be transmitted (NO in step S708), the message writing unit 1011 transmits the message via the communication control unit 104 to subscriber B which has requested delivery (step S709). After transmitting the message, the message writing unit 1011 instructs the message managing unit 1013 to decrement the destination component count 1103 of the transmitted message by one (step S710). At this time, if the destination component count 1103 becomes 0 (NO in step S711), the message writing unit 1011 issues a message deletion request to the message deleting unit 1015 (step S712). Message deletion processing (S713) by the message deleting unit 1015 upon receiving the message deletion request has been described with reference to FIG. 6. The message writing unit 1011 repeats the processes in step S706 and subsequent steps in order indicated by the transmission order counter. If there is no message to be processed (YES in step S708), the message delivery processing ends. In the example of the embodiment, newly entered subscriber B designates delivery to it. However, the communication middleware 105 may transmit a held message when subscriber B registers a subscription. Although not shown in FIG. 7, the request/response unit 1017 generally instructs the communication control unit 104 to wait again for reception of a request after the end of message delivery processing (step S700), and the message delivery processing in FIG. 7 is repeated.

As described above, according to the first embodiment, even a transmitted message is held in accordance with the destination component count and the message holding period, and the held message is transmitted to a newly entered subscriber. The subscriber can receive the message even if it is activated a predetermined period of time after issuing the message.

More specifically, according to the first embodiment, a message is held until it is transmitted predetermined times, since the count at which a message is transmitted is determined in advance. A message transmitted by a transmission component can be reliably transmitted to a reception component which is activated later. For example, even a component whose activation priority is low in the activation time shortening mode or the like can obtain a necessary message later, and can act as if it were activated from the beginning. Since a message which has been transmitted to a predetermined number of components is deleted after the holding period has elapsed, data holding area can be effectively utilized. Even a message which has been transmitted to a predetermined number of components is held for a predetermined period, it is possible to meet a message transmission request from an unexpected reception component during the predetermined period. Furthermore, by resetting the holding period for every message transmission request, for example, when an unspecified number of reception components are generated in every predetermined period, and the message transmission count exceeds an expected one, a message transmission request from a new reception component can be met. By combining the message transmission count and message holding period, the message holding period need not be set long more than necessary, preventing shortage of the data holding area.

<Second Embodiment>

The second embodiment will be described. Details of the software configuration in the second embodiment are the same as those in FIG. 1 used in the first embodiment. However, the second embodiment assumes communication middleware 105 which supports implementation of a server-client model. Hence, a transmission component 101 serves as a server component (to be referred to as a server 101), and reception components 102 and 103 serve as client components (to be referred to as clients 102 and 103).

Data structures used in the second embodiment will be explained with reference to FIGS. 3A to 3C. FIG. 3A exemplifies a data structure managed by a destination information management unit 1016, and shows, as destination component information 1104, information of a destination component which has requested transmission of a message. FIG. 3B exemplifies a data structure managed by a message managing unit 1013. FIG. 3C exemplifies a data structure managed by a message holding period management unit 1014.

Figure 8:
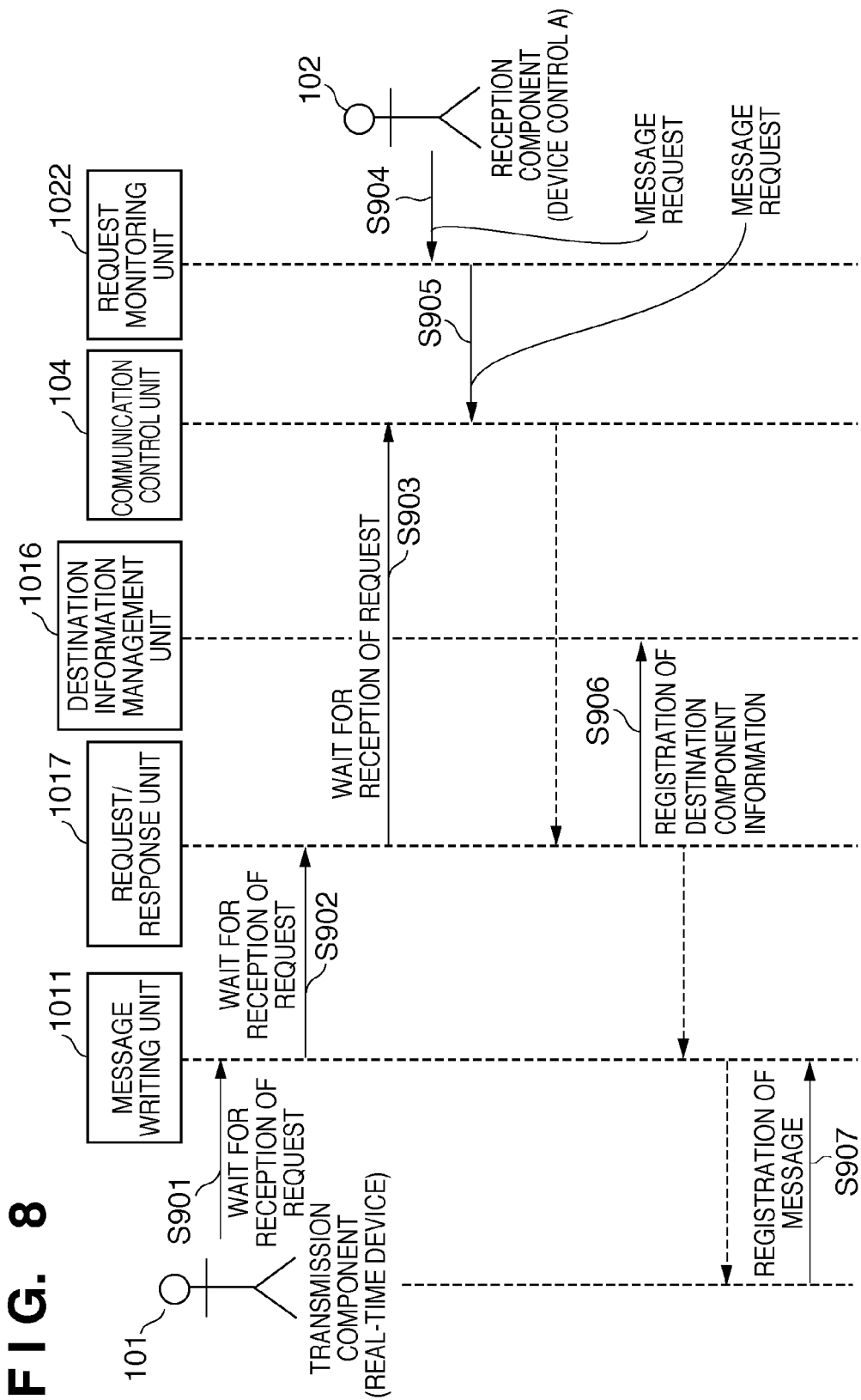
FIG. 8 is a chart exemplifying the sequence of message request processing according to the embodiment.

FIG. 8 is a chart showing the sequence of message request processing from the client 102 to the server 101 in the second embodiment. If a message writing unit 1011 receives a message request reception wait instruction from the server 101 (step S901), it issues a request reception wait instruction to a request/response unit 1017 (step S902). The request/response unit 1017 instructs a communication control unit 104 to wait for reception of a request in preparation for a message request (step S903). If the client 102 issues a message request to the communication middleware 105 (step S904), a request monitoring unit 1022 receives the instruction and issues a message request to the server 101 via the communication control unit 104 (step S905). The request/response unit 1017 registers the received information of the client 102 in the destination information management unit 1016 (step S906). Upon receiving the message request, the server 101 registers a reply message in the message writing unit 1011 (step S907). The sequence of subsequent message reply processing will be explained with reference to FIG. 9.

Figure 9:
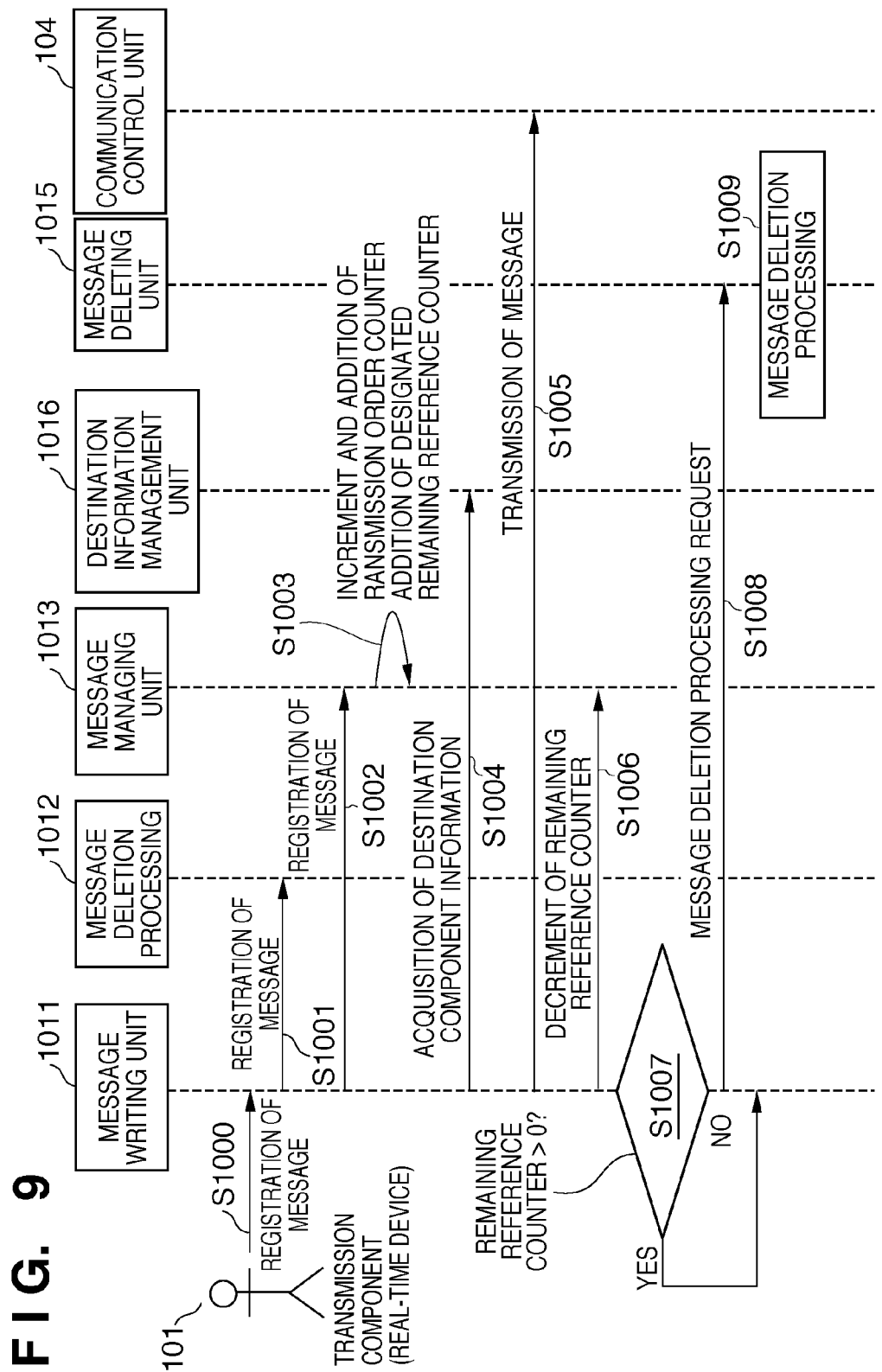
FIG. 9 is a chart exemplifying the sequence of message reply processing according to the embodiment.

FIG. 9 is a chart showing the sequence of message reply processing by the server in the second embodiment. If the server 101 registers a reply message in the message writing unit 1011 (step S1000), the message writing unit 1011 registers the message in a message storing unit 1012 and the message managing unit 1013 (steps S1001 and S1002). As shown in FIG. 3B, the message managing unit 1013 holds a transmission order counter indicating the order of a message transmitted by the server 101, and a destination component count 1103 designated in advance in correspondence with each other (step S1003). Subsequently, the message writing unit 1011 acquires destination component information of the message from the destination information management unit 1016 (step S1004), and transmits the message via the communication control unit 104 (step S1005). The message managing unit 1013 decrements the destination component count 1103 (remaining reference counter) of the transmitted message (step S1006). At this time, if the destination component count 1103 of the message becomes 0 (NO in step S1007), the message writing unit 1011 requests message deletion processing of a message deleting unit 1015 (step S1008). Message deletion processing in step S1009 is the same as the processing in FIG. 6 described in the first embodiment. After sending back the message, the message reply processing ends. Although not shown in FIG. 9, the message request processing in FIG. 8 is repeated after the end of the message reply processing (step S901).

The sequence of processing of delivering a held message to a newly entered client will be explained with reference to FIG. 7 used in the description of the first embodiment. In the following description, the reception component 103 in FIG. 7 serves as the client 103. The second embodiment also assumes a case in which the client 103 is activated a predetermined period of time after the system is activated, to meet an activation time shortening request.

To accept a message delivery request from another component, the request/response unit 1017 instructs the communication control unit 104 to wait for reception of a request (step S700). If a request monitoring unit 1032 receives a delivery instruction from the client 103 (step S701), it issues a message delivery instruction to the server 101 via the communication control unit 104 (step S702). Upon receiving the instruction, the request/response unit 1017 determines whether the message, delivery of which is requested, is during deletion processing. If the message is during deletion processing (YES in step S703), the request/response unit 1017 notifies the message deleting unit 1015 of the acceptance of the message delivery (step S704), in order to stop message deletion processing in progress. The sequence of the message deletion stop processing (step S705) after receiving the message delivery acceptance notification is the same as the processing in FIG. 6 described in the first embodiment. After that, the request/response unit 1017 instructs the message writing unit 1011 to deliver a message (step S706).

The message writing unit 1011 acquires a message managed by the message managing unit 1013 (step S707). The embodiment assumes that a message is acquired in the transmission order by referring to a transmission order counter corresponding to the message. If there is no message managed by the message managing unit 1013, or a message, delivery of which has been requested, has been transmitted, the process ends (YES in step S708). If the message managing unit 1013 manages an untransmitted message (NO in step S708), the message writing unit 1011 transmits the message via the communication control unit 104 to the client 103 which has requested delivery (step S709). After transmitting the message, the message writing unit 1011 instructs the message managing unit 1013 to decrement the destination component count 1103 of the transmitted message by one (step S710). At this time, if the destination component count 1103 becomes 0, the message writing unit 1011 issues a message deletion request to the message deleting unit 1015 (step S712). The sequence of message deletion processing in step S713 upon receiving the message deletion request is the same as the processing in FIG. 6 described in the first embodiment. The message writing unit 1011 repeats the processes in step S706 and subsequent steps in order indicated by the transmission order counter. If there is no message to be processed (YES in step S708), the message delivery processing ends. In the example of the embodiment, the newly entered client 103 designates delivery to it. However, the communication middleware 105 may transmit a held message when the client 103 requests a message. Alternatively, a monitoring component which monitors entry of a client may be prepared separately, and instruct the communication middleware about delivery to a newly entered client. Although not shown in FIG. 7, the request/response unit 1017 generally instructs the communication control unit 104 to wait again for reception of a request after the end of message delivery processing (step S700), and the message delivery processing in FIG. 7 is repeated.

<Third Embodiment>

The third embodiment will be described. The software configuration in the third embodiment is almost the same as that in the first embodiment (FIG. 1). However, communication between a request/response unit 1017 and a message managing unit 1013 is added to FIG. 1.

Figure 12A:
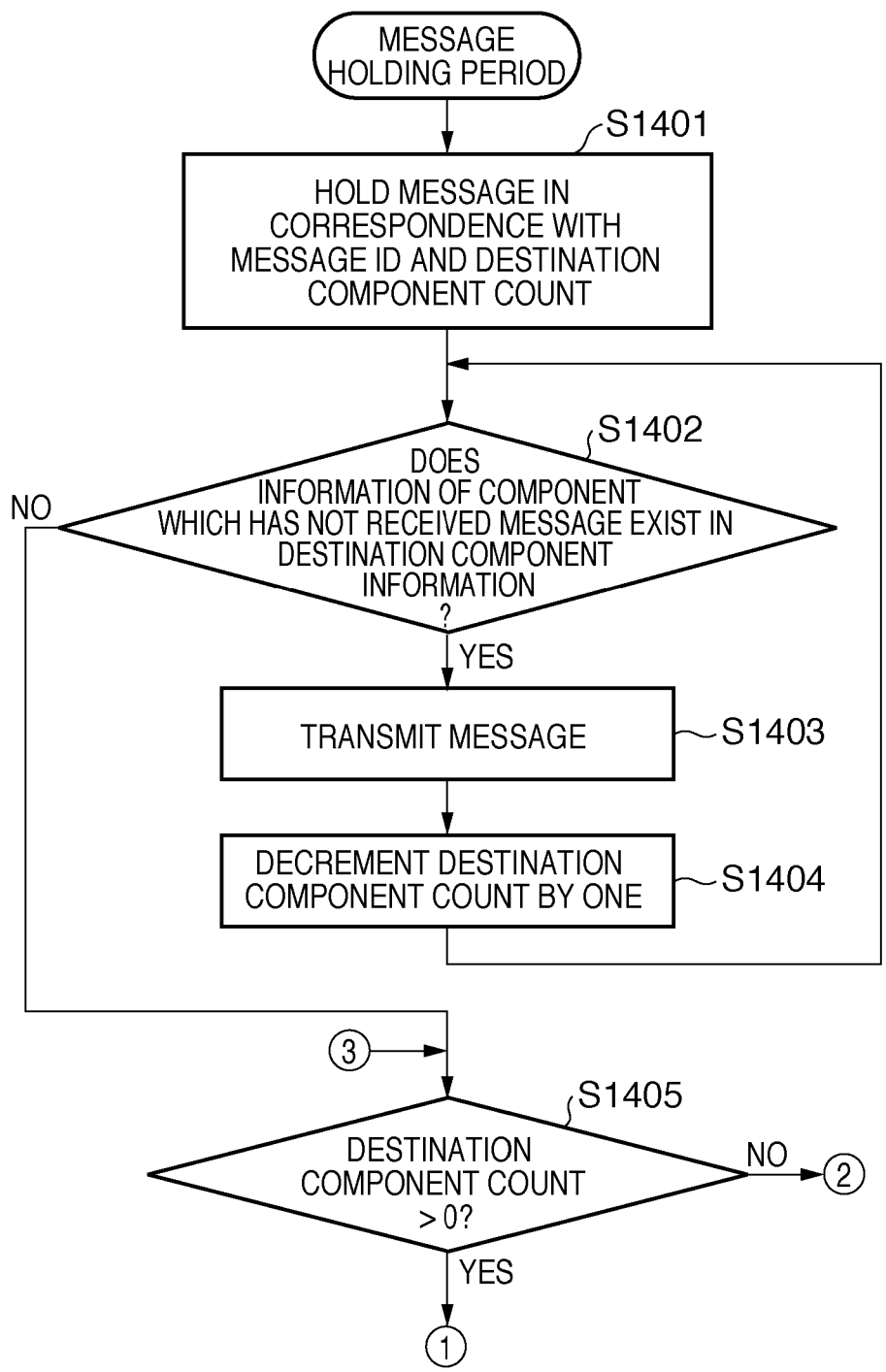
FIGS. 12A and 12B are flowcharts exemplifying the sequence of processing which pays attention to a message according to the embodiment.
Figure 12B:
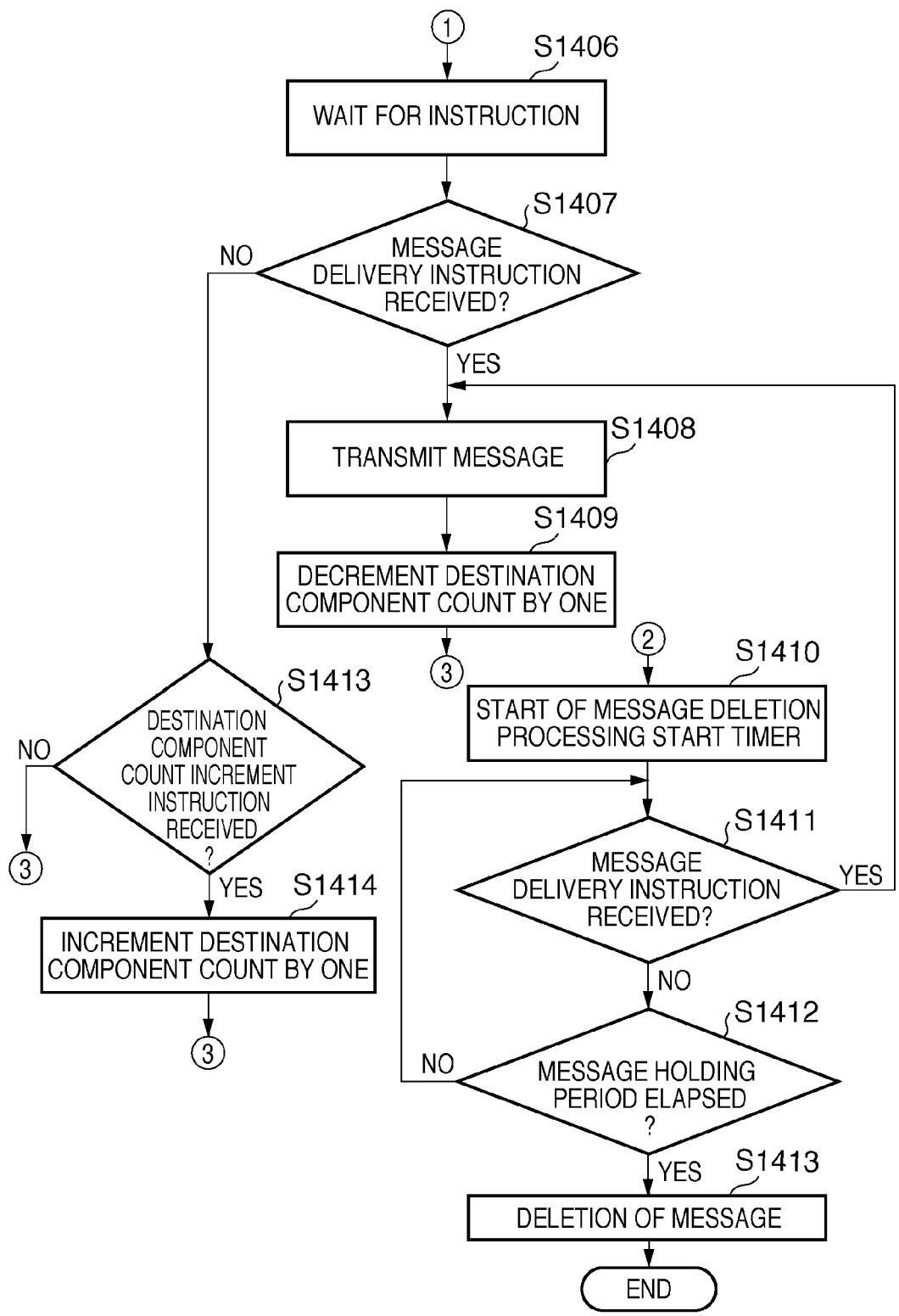

Processing of receiving a message 1101 by communication middleware 105 from a transmission component 101 and deleting it in the third embodiment will be explained with reference to FIGS. 12A and 12B. Upon receiving an instruction from the transmission component 101 to transmit the message 1101, the message managing unit 1013 holds the message 1101 in correspondence with a message ID 1102 and destination component count 1103 (step S1401). Then, a message writing unit 1011 refers to destination component information 1104 corresponding to the message 1101 (step S1402). If there is a component which has not received the message 1101 (YES in step S1402), the message writing unit 1011 transmits the message 1101 to the destination component (step S1403). The message managing unit 1013 decrements the destination component count 1103 of the message 1101 by one (step S1404). The processes in steps S1403 and S1404 are repeated until all components have received the message 1101.

If all components have received the message 1101 (NO in step S1402), and the destination component count 1103 of the message 1101 is larger than 0 (YES in step S1405), the message writing unit 1011 waits for an instruction from the reception component (step S1406). If the message writing unit 1011 receives the message delivery instruction (YES in step S1407), it transmits the message 1101 to the designated destination component (step S1408), and the message managing unit 1013 decrements the destination component count 1103 by one (step S1409). Then, the process returns to step S1405. If the message managing unit 1013 receives an instruction from the request/response unit 1017 to increment the destination component count 1103 (NO in step S1407, YES in step S1413), it increments the destination component count 1103 by one (step S1414), and the process returns to step S1405. The third embodiment assumes that a reception component 102 or 103 designates increment of the destination component count 1103. By designating a change of the destination component count 1103 in accordance with the reception component, a message can be delivered to a reception component, entry of which has not been expected in advance.

If the destination component count 1103 becomes 0 (NO in step S1405), the timer starts for message deletion processing (step S1410). If a message delivery instruction is received (YES in step S1411) before the lapse of a message holding period 1105 (NO in step S1412), the message deletion processing stops, and the process shifts to message transmission processing in step S1408. If the message holding period 1105 has elapsed without receiving a message delivery instruction (YES in step S1412), the message 1101 is deleted (step S1413).

It is also possible to accept an instruction from the reception component 102 or 103 to change the message holding period 1105, and change the message holding period 1105. For example, request monitoring units 1022 and 1032 receive holding period change requests from the reception components 102 and 103, and notify the request/response unit 1017 of them. After the request/response unit 1017 is notified of the holding period change request, it changes the message holding period 1105 managed by the message managing unit 1013. Note that the update unit is, for example, +10 ms.

A specific message out of messages which are held in a message storing unit 1012 and managed by the message managing unit 1013 may be deleted from a software component. In this case, for example, the request monitoring units 1022 and 1032 receive deletion requests containing message IDs from the reception components 102 and 103, and notify the request/response unit 1017 of them. After the request/response unit 1017 is notified of the deletion request, it deletes a message having the message ID designated in the deletion request, out of messages which are held in the message storing unit 1012 and managed by the message managing unit 1013.

A message holding period management unit 1014 may manage the wake-up time (delay time) after activation of the system of a software component that differs between system activation modes, and change the message holding period in accordance with the activation mode. Note that the user designates the activation mode.

<Fourth Embodiment>

In the present invention, even a computer program can implement processes equivalent to the first to third embodiments. In this case, functions, or subroutines executed by the CPU suffice to act as the building elements in FIG. 1 and the like. In general, the computer program is stored in a computer-readable storage medium such as a CD-ROM, and can be executed by setting the storage medium in the reading device (for example, CD-ROM drive) of a computer to copy or install the computer program in the system. Hence, even the computer-readable storage medium falls within the scope of the present invention.

According to the above-described embodiments, a reception component can more reliably receive a message without exhausting the memory.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-001562, filed Jan. 6, 2010, which is hereby incorporated by reference herein in its entirety.

What is claimed is:

1. A message processing apparatus which communicates with a plurality of software components, said apparatus comprising:
at least a processor and memory, cooperating to function as:
a holding unit configured to hold a message received from a software component, the received message including a predetermined number of transmissions which need to be performed for the received message;
a transmission unit configured to transmit the received message held by said holding unit to another software component in response to a delivery request from the other software component;
a management unit configured to manage a number of transmissions still to be performed for the received message and a holding period of the received message, wherein said management unit decrements the number of transmissions still to be performed in response to a transmission of the received message by said transmission unit;
a deletion unit configured to delete the received message, for which the number of transmissions still to be performed has become zero, from said holding unit if no new delivery request is received until the holding period has elapsed after the number of transmissions still to be performed has become zero; and
a destination information management unit configured to accept a reservation request from a software component and register the software component which has made the reservation request, wherein
said transmission unit transmits the received message to the software component registered by said destination information management unit at a reception timing of the received message,
said deletion unit deletes the received message from said holding unit if no new delivery request is received until the holding period has elapsed after transmitting the received message to all components registered by said destination information management unit and performing at least the predetermined number of transmissions for the received message, and
when a new delivery request is received during the holding period, said deletion unit resets said holding period.

2. The apparatus according to claim 1, wherein said management unit changes the holding period in accordance with an instruction from one of the plurality of software components to change the holding period.

3. The apparatus according to claim 1, wherein said management unit accepts an instruction from one of the plurality of software components to change the number of transmissions still to be performed, and changes the number of transmissions still to be performed.

4. The apparatus according to claim 1, wherein when an instruction to delete a specific message is accepted from one of the plurality of software components, said holding unit and said management unit delete information about the specific message.

5. The apparatus according to claim 1, wherein said management unit manages, for each activation mode, a delay time after activation of a system for each of the plurality of software components, and changes a message holding period in accordance with the activation mode.

6. A message processing method for a message processing apparatus which communicates with a plurality of software components, said method comprising:
a holding step of holding a message received from a software component, the received message including a predetermined number of transmissions which need to be performed for the received message;
a transmission step of transmitting the received message held in said holding step to another software component in response to a delivery request from the other software component;
a management step of managing a number of transmissions still to be performed for the received message and a holding period of the received message, wherein the number of transmissions still to be performed is decremented in response to a transmission of the received message in said transmission step;
a deletion step of deleting the received message held in said holding step, for which the number of transmissions still to be performed has become zero, if no new delivery request is received until the holding period has elapsed after predetermined number of
transmissions still to be performed has become zero; and
a destination information management step that accepts a reservation request from a software component and registers the software component which has made the reservation request, wherein
said transmission step transmits the received message to the software component registered by said destination information management step at a reception timing of the received message,
said deletion step deletes the received message from said holding step if no new delivery request is received until the holding period has elapsed after transmitting the received message to all components registered by said destination information management step and performing at least the predetermined number of transmissions for the received message, and
when a new delivery request is received during the holding period, said deletion step resets said holding period.

7. A non-transitory computer-readable storage medium storing an executable computer program for causing a computer to execute a message processing method, said method comprising:
a holding step of holding a message received from a software component, the received message including a predetermined number of transmissions which need to be performed for the received message;

a transmission step of transmitting the received message held in said holding step to another software component in response to a delivery request from the other software component;

a management step of managing a number of transmissions still to be performed for the received message and a holding period of the received message, wherein the number of transmissions still to be performed is decremented in response to a transmission of the received message in said transmission step;

a deletion step of deleting the received message held in said holding step, for which the number of transmissions still to be performed has become zero, if no new delivery request is received until the holding period has elapsed after the predetermined number of transmissions still to be performed has become zero; and a destination information management step that accepts a reservation request from a software component and registers the software component which has made the reservation request, wherein said transmission step transmits the received message to the software component registered by said destination information management step at a reception timing of the received message, said deletion step deletes the received message from said holding step if no new delivery request is received until the holding period has elapsed after transmitting the received message to all components registered by said destination information management step and performing at least the predetermined number of transmissions for the received message, and when a new delivery request is received during the holding period, said deletion step resets said holding period.

* * * * *